(12) United States Patent
Villegas et al.

(10) Patent No.: US 11,625,881 B2
(45) Date of Patent: *Apr. 11, 2023

(54) MOTION RETARGETING WITH KINEMATIC CONSTRAINTS

(71) Applicant: Adobe Inc., San Jose, CA (US)

(72) Inventors: Ruben Eduardo Villegas, East Palo Alto, CA (US); Jun Saito, Seattle, WA (US); Jimei Yang, Mountain View, CA (US); Duygu Ceylan Aksit, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,269

(22) Filed: Sep. 27, 2021

(65) Prior Publication Data
US 2022/0020199 A1 Jan. 20, 2022

Related U.S. Application Data

(63) Continuation of application No. 16/864,724, filed on May 1, 2020, now Pat. No. 11,170,551.

(51) Int. Cl.
| | | |
|---|---|---|
| G06T 13/40 | (2011.01) | |
| G06N 3/08 | (2006.01) | |
| G06T 15/40 | (2011.01) | |
| G06T 15/20 | (2011.01) | |

(52) U.S. Cl.
CPC ............ G06T 13/40 (2013.01); G06N 3/08 (2013.01); G06T 15/20 (2013.01); G06T 15/40 (2013.01)

(58) Field of Classification Search
None
See application file for complete search history.

(56) References Cited

U.S. PATENT DOCUMENTS

| | | | |
|---|---|---|---|
| 9,827,496 B1* | 11/2017 | Zinno | A63F 13/56 |
| 11,170,551 B1* | 11/2021 | Villegas | G06N 3/0445 |
| 2006/0250402 A1 | 11/2006 | Perlin | |
| 2019/0205638 A1 | 7/2019 | Zhang et al. | |
| 2019/0295305 A1 | 9/2019 | Yang et al. | |
| 2020/0290203 A1 | 9/2020 | Taylor et al. | |
| 2021/0343059 A1 | 11/2021 | Villegas et al. | |

OTHER PUBLICATIONS

"Mixamo—Get Animated", Retrieved at: https://www.mixamo.com/#/—on Mar. 6, 2020, 5 pages.
"Non-Final Office Action", U.S. Appl. No. 16/864,724, dated May 13, 2021, 21 pages.
"Notice of Allowance", U.S. Appl. No. 16/864,724, dated Jun. 28, 2021, 15 pages.

(Continued)

*Primary Examiner* — Nurun Flora
(74) *Attorney, Agent, or Firm* — FIG. 1 Patents

(57) ABSTRACT

Motion retargeting with kinematic constraints is implemented in a digital medium environment. Generally, the described techniques provide for retargeting motion data from a source motion sequence to a target visual object. Accordingly, the described techniques position a target visual object in a defined visual environment to identify kinematic constraints of the target object relative to the visual environment. Further, the described techniques utilize an iterative optimization process that fine tunes the conformance of retargeted motion of a target object to the identified kinematic constraints.

20 Claims, 8 Drawing Sheets

(56) References Cited

OTHER PUBLICATIONS

Aberman, Kfir et al., "Learning Character-Agnostic Motion for Motion Retargeting in 2D", May 5, 2019, 14 pages.
Bogo, Federica et al., "Keep it SMPL: Automatic Estimation of 3D Human Pose and Shape from a Single Image", Jul. 27, 2016, 18 pages.
Choi, Kwang-Jin et al., "On-line Motion Retargetting", Oct. 1999, 11 pages.
Gleicher, Michael, "Retargetting Motion to New Characters", Apr. 27, 1998, 10 pages.
Goodfellow, Ian J. et al., "Generative Adversarial Nets", In: Advances in neural information processing systems (2014), Jun. 10, 2014, 9 pages.
Holden, Daniel et al., "A Deep Learning Framework for Character Motion Synthesis and Editing", May 2016, 11 pages.
Kolotouros, Nikos et al., "Learning to Reconstruct 3D Human Pose and Shape via Model-fitting in the Loop", Sep. 27, 2019, 10 pages.
Lee, Jehee, "A Hierarchical Approach to Interactive Motion Editing for Human-like Figures", Jul. 1999, 10 pages.
Lim, Jongin et al., "PMnet: Learning of Disentangled Pose and Movement for Unsupervised Motion Retargeting", Oct. 2019, 14 pages.
Pavlakos, Georgios et al., "Learning to Estimate 3D Human Pose and Shape from a Single Color Image", May 10, 2018, 10 pages.
Tak, Seyoon et al., "A Physically-Based Motion Retargeting Filter", Jan. 2005, 9 pages.
Villegas, Ruben et al., "Neural Kinematic Networks for Unsupervised Motion Retargetting", Apr. 2018, pp. 8639-8648.
Xiang, Donglai et al., "Monocular Total Capture: Posing Face, Body, and Hands in the Wild", Dec. 4, 2018, 17 pages.
Zhou, Yi et al., "On the Continuity of Rotation Representations in Neural Networks", Apr. 12, 2019, 13 pages.

\* cited by examiner

MOTION RETARGETING WITH KINEMATIC CONSTRAINTS

RELATED APPLICATION

This application is a continuation of and claims priority to U.S. patent application Ser. No. 16/864,724, filed May 1, 2020, entitled "Motion Retargeting with Kinematic Constraints", the entire disclosure of which is hereby incorporated by reference herein in its entirety.

BACKGROUND

Computer-based animation systems are implemented to generate and edit digitally animated visual objects, such as part of 3D computer graphics techniques. One particularly useful computer animation technique utilizes motion retargeting that attempts to capture motion data describing the motion of one animated visual object, and transfer the motion data to animate a different visual object. Motion retargeting, for instance, can capture motion data from a variety of different visual objects, such as existing animations of computer-generated imagery, videos of real-world visual objects in motion (e.g., humans, animals, etc.), and so on. The captured motion data can then be "retargeted" to a different visual object to cause the different visual object to mimic the motion of the original visual object.

Conventional techniques for motion retargeting, however, exhibit a number of implementation challenges. For instance, differences in visual structure between different visual objects may cause inaccuracies when attempting to transfer motion data between visual objects. Consider, for example, an implementation where motion data from a first visual object is to be captured and transferred to a second visual object, such as between different computer-generated depictions of humans. The first visual object, however, may have a different skeletal dimensions than a second visual object, such as longer legs, longer arms, and so forth. Conventional motion retargeting techniques may fail to accurately compensate for this difference in skeletal structure, and thus may introduce errors when attempting to transfer motion data from the first visual object to the second visual object.

Further, retargeting motion data from live action video is challenging due to input noise from the video capture process, and differences between human motion (and/or other biological entities) and the way in which 3D computer-generated characters are animated. Generally, errors introduced in such conventional motion retargeting techniques can accumulate over time and cause undesired artifacts in retargeted motion of a target visual object, such as floating, sinking, surface skating, and other unintended visual attributes. Accordingly, conventional motion retargeting may introduce errors in motion retargeting between visual objects, which may require manual intervention to correct such errors. As a result, motion retargeting using conventional animation systems can be inaccurate and burdensome not only from a user perspective, but also on system resources. This not only presents an undesirable user experience, but wastes system resources (e.g., processor bandwidth, memory, network bandwidth, and so forth) utilized to correct inaccurately transferred motion data.

SUMMARY

Motion retargeting with kinematic constraints is leveraged in a digital medium environment. Generally, the described techniques provide for increased accuracy in retargeting motion data from a source motion sequence to a target visual object. Accordingly, to mitigate the challenge of undesired visual artifacts in retargeting motion to a target visual object, the described techniques position a target visual object in a defined visual environment to identify kinematic constraints of the target object relative to the visual environment. Further, the described techniques utilize an iterative optimization process that fine tunes the conformance of retargeted motion of a target object to the identified kinematic constraints.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
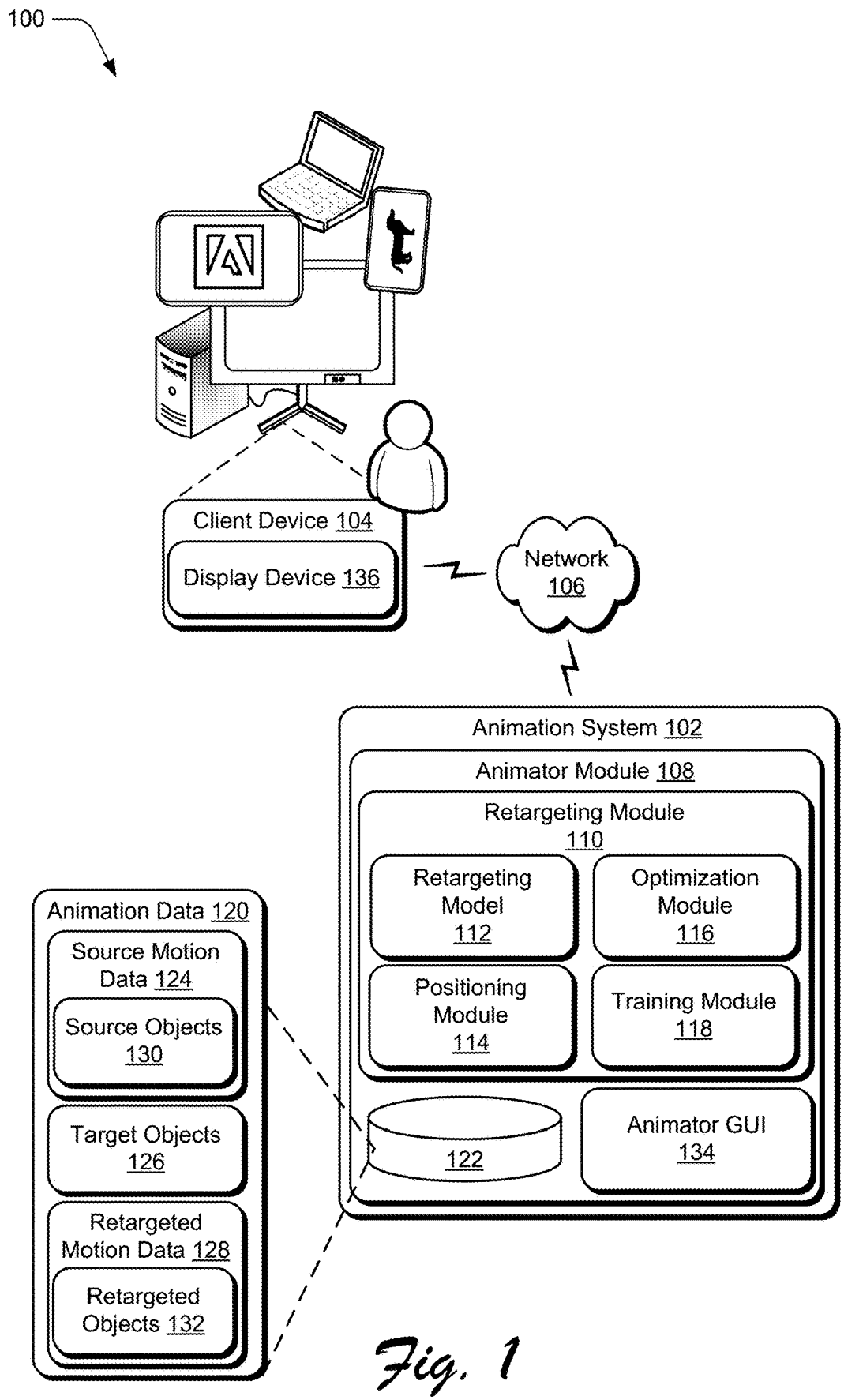
FIG. 1 is an illustration of an environment in an example implementation that is operable to employ techniques described herein.

To overcome the challenges to motion retargeting presented in typical animation systems, motion retargeting with kinematic constraints is leveraged in a digital medium environment. For instance, the described techniques provide for increased accuracy in retargeting motion data from a source motion sequence to a target visual object. Accordingly, to mitigate the challenge of undesired visual artifacts in retargeting motion to a target visual object, the described techniques position a target visual object in a defined visual environment to identify kinematic constraints of the target object relative to the visual environment. Further, the described techniques utilize an iterative optimization process that fine tunes the conformance of retargeted motion of a target object to the identified kinematic constraints.

For instance, consider a scenario where a user selects a source motion sequence and a target visual object for motion retargeting from the source motion sequence. The source motion sequence, for instance, includes source motion data that describes motion of a source visual object over time, such as motion of a digital character, motion from capture of live-action motion of a real-world entity, and so forth. Generally, the source motion data can describe motion of the source object in various ways, such as with reference to rotations of joints of the source object, and movement of a "root joint" of the source object. Further, the source motion data can describe dimensions of the source object, such as source object height, length of source object limbs, and so forth, as well as joint coordinates for joints of the source object. Further, the target visual object includes data describing attributes of the target object, such as target object dimensions, joint coordinates, and so forth.

Accordingly, a retargeting module processes the source motion sequence and the target object to generate retargeted motion data that applies the source motion sequence to the target object to retarget motion of the source object to the target object. Generally, this enables the target object to be animated to simulate the source motion sequence. In at least one implementation, the retargeting module includes a recurrent neural network (RNN) including an encoder RNN and a decoder RNN. The encoder RNN, for instance, encodes attributes of the source motion sequence, such as joint coordinates and root velocities of the source object. The decoder RNN decodes the encoded attributes along with attributes of the target object to generate joint rotations and root motion to be applied to the target object. Further, a forward kinematics layer processes the target object joint rotations to generate different "poses" of the target object, which includes different sets of joint coordinates for the target object as part of a retargeted motion sequence.

To enable kinematic constraints to be observed as part of retargeting motion, the target object is positioned within a visual space. The visual space, for instance, represents a visual environment in which the retargeted animation of the target object is to be visually positioned as part of displaying the retargeted animation. In at least one implementation, the visual space represents a coordinate space, and positioning the target object includes positioning joints of the target object to corresponding coordinates of the coordinate space. Generally, by placing the target object within the visual space, different kinematic constraints may be identified based on a visual relationship of the target object to attributes of the visual space. For instance, the kinematic constraints enable the retargeted animation to accurately recreate the source motion sequence, as well as to simulate real-world physics within the visual space. For instance, the visual space may include a ground surface (e.g., a floor), and a kinematic constraint can be applied to ensure that the target object maintains contact with the ground surface without sinking or skating on the surface.

To optimize conformance with the kinematic constraints, an iterative optimization process is implemented that feeds (e.g., backpropagates) attributes of retargeted motion back into the RNN to update the motion attributes to more closely conform to the kinematic constraints. This "in-network" optimization can be performed until an optimization objective is achieved, such as a specified number of iterations and/or a maximum conformance with a kinematic constraint. Further, a "weak" supervision strategy can be implemented that utilizes attributes of source motion to train the RNN as part of fine-tuning the motion retargeting process.

Accordingly, techniques for motion retargeting with kinematic constraints overcome the challenges in traditional neural network-based motion retargeting. For instance, placing a target object within a defined visual space (e.g., a coordinate space), kinematic constraints can be identified. Further, by utilizing in-network iterative optimization and weak supervision, more accurate compliance with kinematic constraints is achieved than is provided by conventional neural network-based systems.

Term Descriptions

These term descriptions are provided for purposes of example only and are not intended to be construed as limiting on the scope of the claims.

As used herein, the term "motion retargeting" refers to utilizing data describing motion of a source object to cause corresponding motion of a target object. Motion of the source object, for instance, can be characterized in different ways, such as with reference to movement of different visual attributes of the source object. Different aspects of source object motion can be adapted for a target object and utilized to animate the target object.

As used herein, the terms "source motion object" and "source object" refer to data that, when rendered, depicts a visual object that exhibits motion over a period of time. A source object, for instance, can be a digitally created character (e.g., a humanoid character), such as a digital 3D representation of a character generated via computer graphics techniques. A source object can also refer to captured motion of a live-action entity, such as biological entity, e.g., a human.

As used herein, the term "target object" refers to a visual object that can receive retargeted motion data from a source object. Generally, a target object can be implemented in various ways, such as a digitally created character (e.g., a humanoid character), a digitally captured representation of a real-world entity (e.g., a human), and so forth.

As used herein, the term "visual space" refers to a defined visual environment in which motion retargeting can occur. A visual space, for instance, may represent a coordinate space (e.g., a Cartesian coordinate space) in which a target object can be positioned and animated. Further, a visual space can include different surfaces that represent constraints on movement of a target object during motion retargeting.

As used herein, the term "kinematic constraint" refers to constraints and/or limitations on movement of a target object within a visual space as part of motion retargeting. For instance, a kinematic constraint can specify that a target object is to maintain contact with a ground surface of a visual space without sinking into or floating above the ground surface.

In the following discussion, an example environment is first described that may employ the techniques described herein. Example systems and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ motion retargeting with kinematic constraints as described herein. The illustrated environment 100 includes an animation system 102 and a client device 104 that are communicatively coupled, one to another, via a network 106. Alternatively or in addition, the animation system 102 can reside on the client device 104, such as in the form of an application and/or other logic that resides on the client device 104.

Computing devices that are usable to implement the animation system 102 and the client device 104 may be configured in a variety of ways. A computing device, for instance, may be configured as a desktop computer, a laptop computer, a mobile device (e.g., assuming a handheld configuration such as a tablet or mobile phone), and so forth. Further, a computing device may be representative of a plurality of different devices, such as multiple servers utilized by a business to perform operations "over the cloud" as further described in relation to FIG. 8.

The animation system 102 includes an animator module 108 that is representative of functionality to enable various animation-related tasks to be performed further to techniques for motion retargeting with kinematic constraints described herein. Accordingly, the animator module 108 leverages a retargeting module 110, which is representative of functionality to retarget motion data from motion data sources (e.g., source motion sequences) to target visual objects to generate retargeted animations. To enable its various functionality, the retargeting module 110 leverages a retargeting model 112, a positioning module 114, an optimization module 116, and a training module 118. The retargeting model 112 represents functionality for taking input motion data (e.g., from a source motion sequence) and processing the input motion data to generate output motion data that can be "retargeted" (e.g., applied) to a target visual object (and/or set of visual objects) to animate the target visual object. As further detailed below, the retargeting model 112 can be implemented as a machine learning model and/or set of models that utilizes artificial intelligence (AI) techniques to identify key characteristics of input motion data, and to provide output motion data that accurately applies the input motion data to animate a target object.

The positioning module 114 represents functionality for positioning retargeted motion data within a visual environment in which a target object is to be animated via the retargeted motion data. For instance, the positioning module 114 positions retargeted motion data within a coordinate system (e.g., an x/y/z coordinate system) to enable a target visual object that is animated via the retargeted motion data to be appropriately positioned within the coordinate system. Further, the optimization module 116 optimizes a target visual object's position within the visual environment (e.g., coordinate system) to enable the visual object to comply with certain kinematic constraints within the visual environment. As part of retargeting motion data to a target visual object, for instance, the optimization module 116 optimizes the target visual object's position in a visual environment to enable the visual object to exhibit an appropriate visual relationship to other objects within the visual environment, such as a floor, a wall, other visual objects, etc.

The training module 118 represents functionality to train the retargeting module 110 to accurately retarget animation data from a source motion sequence to a target visual object. As detailed below, for instance, the training module 118 implements a weak supervision strategy along with a defined training objective that utilize cues from input animation data as training data for training the system to retarget animation data.

The animation system 102 further maintains motion data 120 stored on a storage 122 and that can be leveraged to perform various aspects of motion retargeting with kinematic constraints described herein. For instance, the motion data 120 includes source motion data 124, target objects 126, and retargeted motion data 128. The source motion data 124 includes source motion objects ("source objects") 130 and motion data that describes how the source objects 130 are animated. The source objects 130, for instance, represent visual objects generated by a graphics editing system that are animated, real-world entities (e.g., humans) that are captured in motion, and so forth. Accordingly, the source motion data 124 includes data that describes various visual and motion attributes of the source objects 130, such as character pose data that describes a relative orientation of source objects 130 at different points of a motion sequence, velocity data that describes speed of movement of source objects at different time points of a motion sequence, and so forth.

The target objects 126 represent visual objects that can be animated using retargeted motion data from the source motion data 124. Generally, the target objects 126 can include a variety of different visual objects, such as 2D/3D computer-generated imagery. The retargeted motion data 128 includes data that is extracted from the source motion data 124, processed, and applied to the target objects 126 to generated retargeted animated objects ("retargeted objects") 132. The retargeting module 110, for instance, takes the source motion data 124 and the target objects 126 as input, and applies techniques for motion retargeting with kinematic constraints described herein to generate the retargeted objects 132. The retargeted objects 132, for instance, represent target objects 126 that are animated in ways to emulate (e.g., imitate) motion of the source objects 130.

Further to the environment 100, the animator module 108 includes an animator graphical user interface (GUI) 134 that is configured to enable user interaction with the animation system 102. The animator GUI 134, for instance, is output via a display device 136 of the client device 104, and a user can interact with the animation system 102 via interaction with the animator GUI 134. Further, output from the animator module 108 can be displayed via the animator GUI 134 on the display device 136.

Having considered an example environment, consider now a discussion of some example details of the techniques for motion retargeting with kinematic constraints in a digital medium environment in accordance with one or more implementations.

Implementation Details

Figure 2:
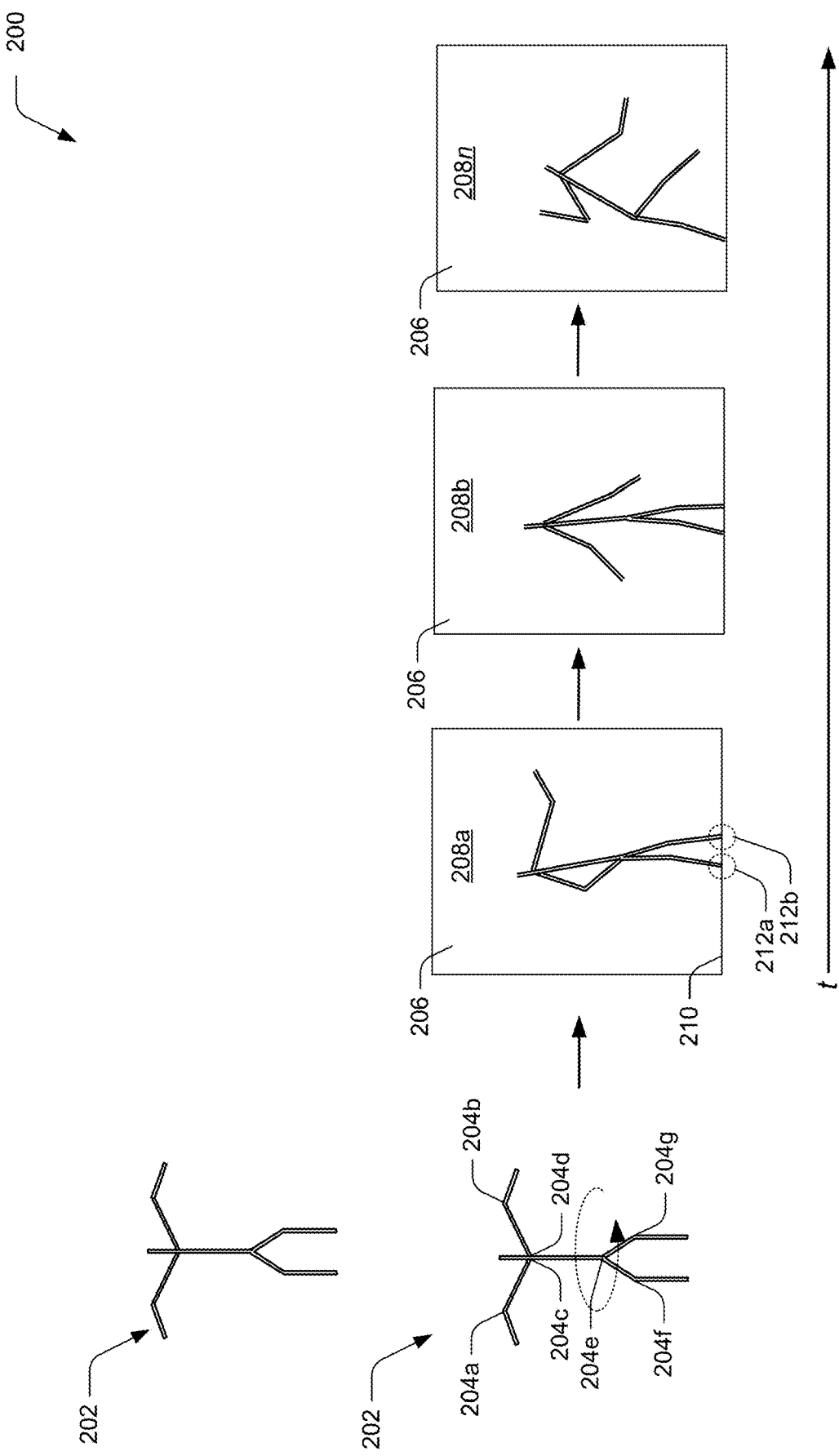
FIG. 2 depicts an example scenario illustrating aspects of motion retargeting with kinematic constraints.

FIG. 2 depicts an example scenario 200 illustrating aspects of motion retargeting with kinematic constraints. The scenario 200 depicts a visual object in the form of a digital skeleton 202, which represents a digital structure upon which a visual object can be created. For instance, a source object 130 and/or a target object 126 can be generated based on the digital skeleton 202. To enable the digital skeleton 202 to be animated, the skeleton includes multiple joints 204 ($204a$-$204g$) that connect different structural members (e.g., limbs) of the digital skeleton 202. Generally, the digital skeleton 202 can be animated by moving the digital skeleton translationally, as well as manipulating (e.g., translating, rotating) the joints 204. Among the joints 204 is a root joint $204e$, which represents a reference position on the digital skeleton 202 that functions as a reference point for other joints 204 in the digital skeleton 202. For instance, motion of the digital skeleton 202 can be characterized via movement of the joints 204 including the root joint $204e$. As further detailed below, retargeting animation data can include characterizing velocity and/or rotation of the root joint $204e$.

The scenario 200 further depicts the digital skeleton 202 positioned within a visual space 206 in which the digital skeleton 202 can be animated. The visual space 206, for example, represents a visual environment in which the digital skeleton 202 is positioned and in which animation of the digital skeleton 202 can be depicted. Accordingly, the digital skeleton 202 is animated over different time points t between different poses 208 (208a-208n), such as by manipulating instances of the joints 204 between different positions. The animation, for instance, is generated via retargeted motion data according to techniques for motion retargeting with kinematic constraints described herein.

As part of animating the digital skeleton 202, the described techniques apply kinematic constraints on motion of the digital skeleton 202 to cause the animation to behave appropriately relative to the visual space 206, such as to simulate real-world physics in the visual space 206. For instance, in the different poses 208, the digital skeleton 202 makes contact with a ground surface 210 of the visual space 206 at different contact points 212a, 212b. In at least some implementations, the contact points can be based on "end effectors" of the digital skeleton 202, such as feet and/or hands.

Generally, this contact with the ground surface 210 represents a kinematic constraint that ensures that animation of the visual skeleton 202 visually resembles "real world" behaviors, such as contact with surfaces and/or objects in the visual space 206. Further, applying such kinematic constraints avoids other aberrant visual behaviors, such as "skating" on and sinking into the ground surface 210. The ground surface 210 is discussed for purposes of example only, and it is to be appreciated that kinematic constraints can be defined for a variety of different visual attributes of a visual space. Accordingly, the described techniques enforce such kinematic constraints to enable retargeted animations to avoid unnatural visual artifacts.

Figure 3:
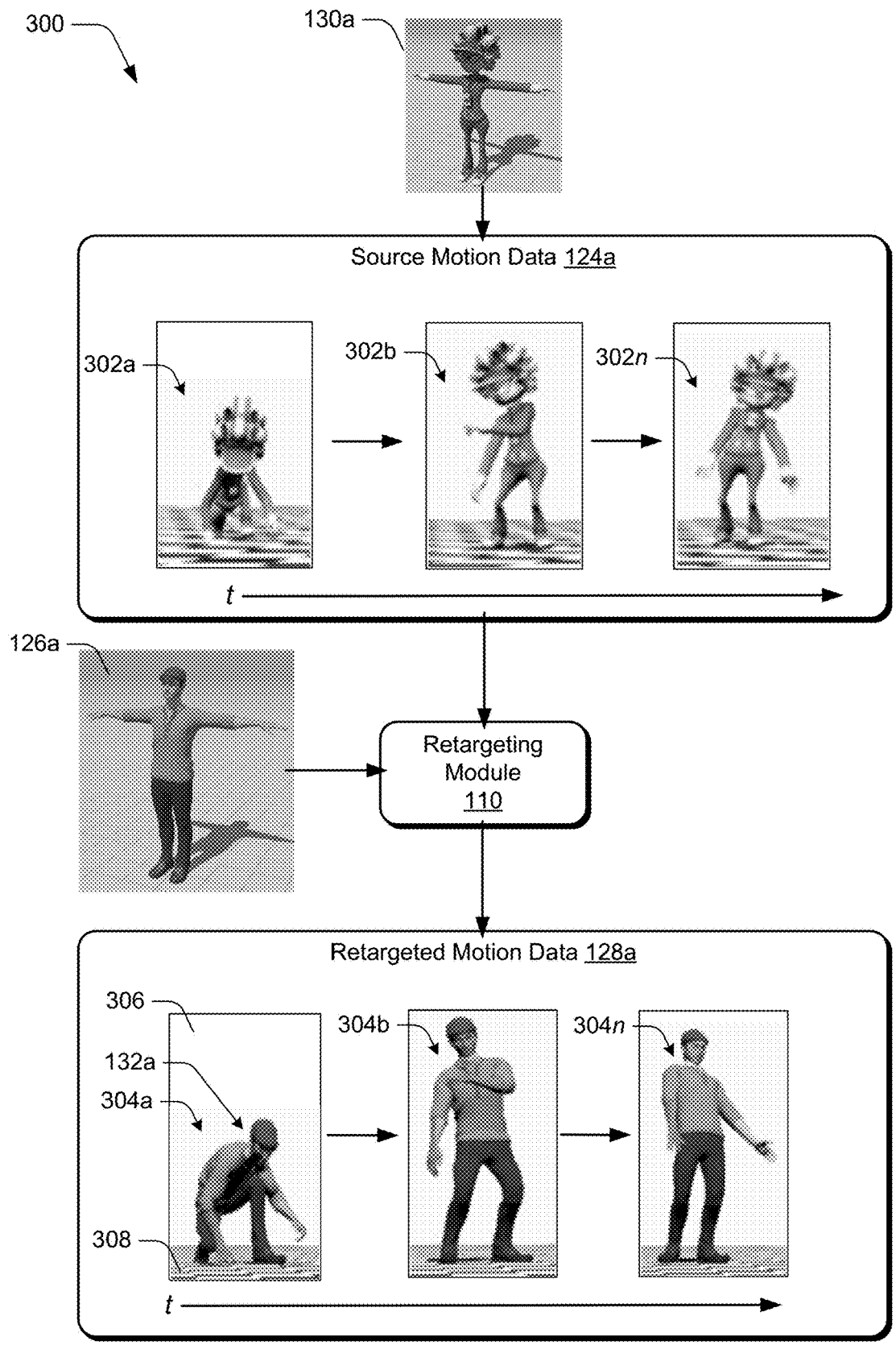
FIG. 3 depicts an example system that represents an overview of processes for motion retargeting with kinematic constraints.

FIG. 3 depicts an example system 300 that represents an overview of processes for motion retargeting with kinematic constraints in accordance with various implementations. More detailed discussions of individual aspects of the system 300 are presented subsequently. In the system 300, the retargeting module 110 takes source motion data 124a and a target object 126a as input. Generally, the source motion data 124a represents motion of a source object 130a. Further, the source motion data 124a includes a source pose 302a, a source pose 302b, and a source pose 302n. The source poses 302a-302n, for instance, represent different positions of the source object 130a at different time points from source motion data 124a. In at least one implementation, the source object 130a can be generated based on the digital skeleton 202.

Accordingly, the retargeting module 110 processes the source motion data 124a and the target object 126a to generate retargeted motion data 128a that includes a retargeted object 132a animated to simulate the source motion data 124a. The retargeted motion data 128a, for instance, is applied to animate a static target object 126a. The retargeted motion data 128a includes a target pose 304a, a target pose 304b, and a target pose 304n that each represent different positions of the retargeted object 132a at different time points from the retargeted motion data 128a. Generally, the target poses 304a-304n each simulate a respective source pose 302a-302n from the source motion data 124a.

In the system 300, as part of retargeting animation to the target object 126a, the retargeted object 132a is placed within a visual space 306 that includes a ground surface 308. As introduced above, contact by the retargeted object 132a with the ground surface 308 represents a kinematic constraint on retargeting of the source motion data 124a to the target object 126a. Further, by applying kinematic constraints in motion retargeting, other undesirable visual behaviors can be avoided, such as the retargeted object 132a skating and sinking relative to the ground surface 308.

Figure 4:
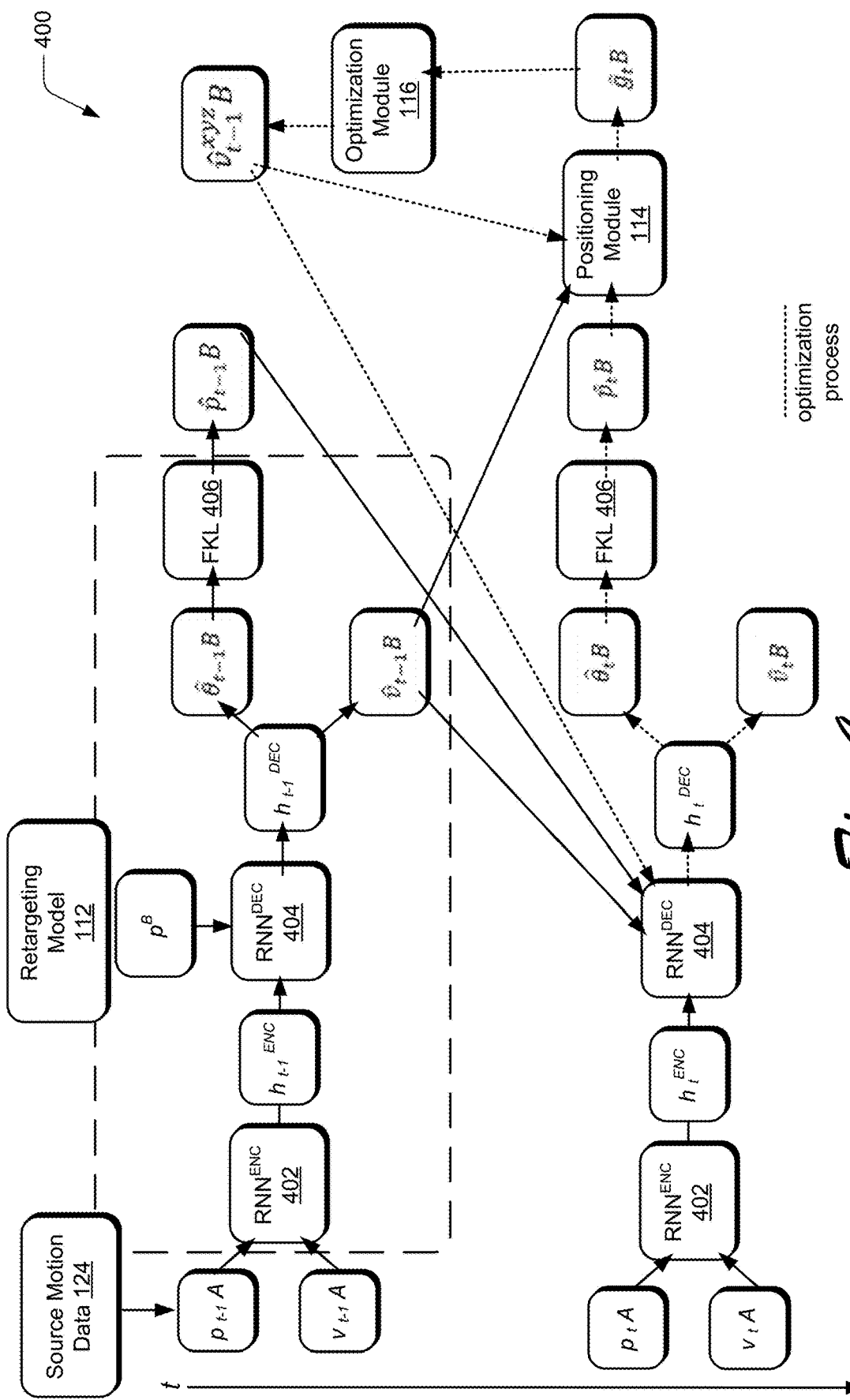
FIG. 4 depicts an example system that details aspects of processes for motion retargeting with kinematic constraints in accordance with various implementations.

FIG. 4 depicts an example system 400 that details aspects of processes for motion retargeting with kinematic constraints in accordance with various implementations. The system 400 includes features of the retargeting model 112, including an encoder RNN 402, a decoder RNN 404, and a forward kinematics layer (FKL) 406. Operation of the retargeting model 112 is explained in detail in U.S. Patent App. Pub. No. 2019/0295305 A1 to Yang et al. assigned to Adobe® Inc., titled "Retargeting Skeleton Motion Sequences Through Cycle Consistency Adversarial Training Of A Motion Synthesis Neural Network With A Forward Kinematics Layer" and filed 20 Mar. 2018 (hereinafter "'305 Publication"), the entire contents of which are hereby incorporated by reference herein.

In an example operation, the retargeting model 112 takes as input motion of a visual character A (e.g., a source object 130) and reference joint coordinates e for a target visual character B, and generates a retargeted motion to be performed by the visual character B, e.g., a target object 126. In this particular example, input and output object motion is characterized with reference to motion of a visual character with multiple joints and a root position, e.g., the root joint 204e of the digital skeleton 202. For instance, a character can be represented via a skeleton with multiple connected members (e.g., limbs) connected via joints. Further, a root joint represents as a reference position on a character that functions as a reference for other joints in the character. In a humanoid representation, for instance, a root joint may be located at or near the center of a pelvis, or located at or near an intersection of two hips. Thus, input character motion can be characterized via movement of different joints including a root joint, which can be retargeted to a target character.

Accordingly, input motions of A and output motions of B are decomposed into character pose p as joint positions relative to the character root joint, $p_{1:T}^{A} \in \mathbb{R}^{T \times 3J}$, and $\hat{p}_{1:T}^{B} \in \mathbb{R}^{T \times 3J}$, and root motion, $v_{1:T}^{A} \in \mathbb{R}^{T \times 4}$ and $\hat{v}_{1:T}^{B} \in \mathbb{R}^{T \times 4}$ where the first three values are velocities in the x,y,z directions in a visual space, and the final value r is a root rotation about a y-axis in an axis-angle representation.

The encoder RNN 402 takes source motion data 124 as input in the form of pose attributes ($p^{-1}$) of a source object at different times t, and motion attributes ($v^A$)(velocity) of the source object. Generally, $p^A$ and $v^A$ are characterized relative to a root joint of a source character. The encoder RNN 402 encodes the pose and motion attributes to generate encoded data $h_{t-1}^{ENC}$, the decoder RRN 404 takes the reference joint coordinates $j^B$ of the target character B and $h_{t-1}^{ENC}$ as input and the decoder RNN 404 decodes the encoded data to generate decoded data $h_{t-1}^{DEC}$, including a joint rotations $\hat{\theta}^B$ for character B, and root motion $\hat{v}^B$ for a root position of character B. The FKL 406 takes the joint rotations $\hat{\theta}^B$ as input and computes a pose $\hat{p}^B$ for character B, e.g., joint positions for joints of character B. Generally, this process iterates over multiple time values t to generate different poses for the character B that are applied to animate the character B.

In at least one implementation, a forward pass through the retargeting model 112 is defined as:

$$h_t^{enc} = f^{enc}(p_t^A, v_t^A, h_{t-1}^{enc}) \tag{1}$$

$$h_t^{dec} = f^{dec}(\hat{p}_{t-1}^B, \hat{v}_{t-1}^B, h_t^{enc}, h_{t-1}^{dec}, s^B) \tag{2}$$

$$\hat{\theta}_t^B = f^\theta(h_t^{dec}) \tag{3}$$

$$\hat{p}_t^B = FKL(\theta_t^B, s^{-B}) \quad (4)$$

$$\hat{v}_t^B = f^v(h_t^{dec}) \quad (5)$$

Generally, $f^{enc}$ and $f^{dec}$ represent the encoder RNN 402 and the decoder RNN 404, respectively. Further, $f^\theta$ takes as input the output from the decoder RNN 404 and outputs a rotation representation $\theta_t^B$. The FKL 406 uses forward kinematics given $\theta_t^B$ and target skeleton joint offsets $s^{-B}$ to generate a target skeleton pose $\hat{p}_t^B$ for the character B. Further, $f^v$ is a function that takes output from the decoder RNN 404 and generates root motion $\hat{v}_t^B$ used to animate a root joint of character B. As referenced previously, further details concerning operation of the retargeting model 112 are presented in the '305 Publication.

To enable kinematic constraints to be applied to retargeting motion from character A to character B, the positioning module 114 combines local pose data $\hat{p}_t^B$ and root motion data $\hat{v}_{t-1}^B$ and uses this data to position the character B into a visual space. In at least one implementation, the positioning module 114 implements the following operations:

$$R_t = \text{rotmat}(v_{t-1}^r) R_{t-1} \quad (1)$$

$$d_t = R_t v_{t-1}^{xyz} + d_{t-1} \quad (2)$$

$$g_t = R_t p_t + d_t \quad (3)$$

Generally, $R_t \in \mathbb{R}^{3\times 3}$ is a rotation matrix that represents the accumulated root joint rotations with respect to the y-axis up to time t, and rotmat converts a rotation in the axis-angle representation to a rotation matrix. $v_{t-1}^r \in \mathbb{R}$ is the component of $v_{t-1}$ which represents rotations about the y-axis in axis-angle form, $v_{t-1}^{xyz} \in \mathbb{R}^3$ are the first 3 components of $v_{t-1}$ that represent translational movement of a root joint. The variable $d_t \in \mathbb{R}^3$ represents the accumulated root translation up to time t, and $g_t \in \mathbb{R}^{3J}$ is the set of character joint locations in coordinates of the visual space. Generally, kinematic constraints that are applied on $g_t$ are subsequently applied to $p_t$ and $v_{t-1}$ through backpropagation and affect optimization of the system 400. In at least one implementation, $R_t$ is initialized to an identity transformation and $d_t$ to zero at t=0.

In conjunction with identifying kinematic constraints based on positioning via the positioning module 114, the system 400 leverages the optimization module 116 to facilitate an in-network iterative optimization procedure during forward propagation of the system 400 such that kinematic constraints are met while output of the system 400 is constrained within a defined visual space. Specifically, based on the output of the positioning module 114, the velocity of the root joint is optimized by feeding it back through the decoder RNN 404 such that outputs of the decoder RNN 404 at time t more closely conform to specified kinematic constraints for a visual space. In this particular example, signal flow of the optimization operations are depicted using dashed lines.

In at least one implementation, in-network optimization is performed by minimizing the objective:

$$\mathcal{L}^{optim}(g_t, \theta_t) = \mathcal{L}^c(g_t) + \mathcal{L}^a(\theta_t)$$

Generally, $\mathcal{L}^c(g_t)$ encodes kinematic constraints defined by the following loss function:

$$\mathcal{L}^c(g_t) = c_t \odot (\|g_t - g_{t-1}\|_2^2 + g_t^y\|_2^2)$$

In this loss function, $c_t \in \{0,1\}^J$ is a binary vector (explained in more detail below) that indicates whether a joint is in contact with a surface of a visual space (e.g., a ground surface), and $g_t^y \in \mathbb{R}^J$ is the y component of character joint locations in the visual space. While implementations are discussed with reference to a ground/floor surface of a visual space, the described techniques can be implemented to apply kinematic constraints to any suitable surface/object in a visual space.

Since the updated root velocities affect joint rotations predicted by the retargeting model 112, a second term is introduced in the optimization objective $\mathcal{L}^a(\theta_t)$ to avoid excessive deviation from the initially predicted joint rotations:

$$\mathcal{L}^a(\theta_t) = \|\theta_t^0 - \theta_t\|_2^2$$

In this term, $\theta_t^0$ are joint rotations output by the retargeting model 112 prior to optimization by $\mathcal{L}^{optim}(g_t, \theta_t)$, and $\theta_t$ are the joint rotations output by the retargeting model 112 after an optimization step. Accordingly, $\theta_t = \theta_t^0$ before optimization is initiated. Based on the optimization objective above, the optimization module 116 executes the following optimization algorithm:

```
input: p_{1:T}^A, v_{1:T}^A
output: p̂_{1:T}^B, v̂_{1:T}^B, θ̂_{1:T}^B
for t=1 to T do
    h_t^enc ← f^enc(p_t^A, v_t^A, h_{t-1}^enc)
    for n=1 to N do
        h_t^dec ← f^dec(p̂_{t-1}^B, v̂_{t-1}^B, h_t^enc, h_{t-1}^dec, s^B)
        θ̂_t^B ← f^θ(h_t^dec)
        p̂_t^B ← FK(θ̂_t^B, s^B)
        v̂_t^B ← f^v(h_t^dec)
        if t > 1 then
            ĝ_t^B ← f^world(p̂_t^B, v̂_{t-1}^B)
            v̂_{t-1}^{xyz B} ← v̂_{t-1}^{xyz B} - α ∂L^optim(ĝ_t^B, θ̂_t^B) / ∂v̂_{t-1}^{xyz B}
        else
            break
        end if
    end for
end for
```

Accordingly, optimization for the root position velocity is performed at each retargeting step according to:

$$\hat{v}_{t-1}^{xyz} = \hat{v}_{t-1}^{xyz} - \alpha \frac{\delta \mathcal{L}^{optim}}{\delta \hat{v}_{t-1}^{xyz}}$$

where $$\frac{\delta \mathcal{L}^{optim}}{\delta \hat{v}_{t-1}^{xyz}}$$

backpropagates through $f^{dec}$ by:

$$\frac{\delta \mathcal{L}^{optim}}{\delta \hat{v}_{t-1}^{xyz}} = \frac{\delta \mathcal{L}^{optim}}{\delta \hat{g}_t} \frac{\delta \hat{g}_t}{\delta f^{world}} \frac{\delta f^{world}}{\delta \hat{p}_t} \frac{\delta \hat{p}_t}{\delta h_t^{dec}} \frac{\delta h_t^{dec}}{\delta \hat{v}_{t-1}^{xyz}} + \frac{\delta \mathcal{L}^{optim}}{\delta f^{world}} \frac{\delta f^{world}}{\delta \hat{v}_{t-1}^{xyz}}$$

The first term computes how the root joint motion $\hat{v}_{t-1}^{xyz}$ is to change such that object joints $\hat{p}_t$ move locally within the visual space toward kinematic constraint points, e.g., contact points in the visual space. The second term finds the change in $\hat{v}_{t-1}^{xyz}$ such that the root joint moves globally toward the kinematic constraint points. Further, both of these terms combined result in the visual character B reaching kinematic constraint points during the motion retargeting. In at least one implementation, $\hat{v}_{t-1}^r$ is not optimized because it's possible for character B to rotate around an axis (e.g., y axis)

perpendicular to a ground surface of a visual space while conforming to the kinematic constrains (e.g., floor contact) in a case where a single contact point is detected in the input animation data, e.g., motion of the input character A input to the system 400.

Further to the system 400, a weak supervision strategy can be utilized to fine-tune motion retargeting. For instance, parameters of input motion data from a source character provide cues for training a motion retargeting result. To implement a weak supervision strategy, joint rotations and root joint motion (scaled based on leg height ratio of source and target objects) of input animation data are utilized to perform supervision on motion retargeting. In one example, a weak supervision objective is defined as:

$$\mathcal{L}^{weak} = \frac{1}{T}\sum_{t=1}^{T}\rho\left\|\hat{\theta}_t^B - \hat{\theta}_t^A\right\|_2^2 + \left\|\hat{v}_t^B - \tilde{v}_t^{A\to B}\right\|_2^2$$

In this equation, $\theta_t^A$ and $\hat{\theta}_t^B$ are the joint rotations for the input motion and the output motion of $f^\theta(f_t^{dec})$, respectively, and are both represented in 6-dimensional form (e.g., with reference to a six-dimensional space); $\rho$ is a hyperparameter. Further, $\hat{v}_t^B$ is the output of $f^v(h_t^{dec})$ and $\tilde{v}_t^{A\to B}$ is the root joint motion of character A ($v_t^A$) scaled by the leg height ratio of character A and B. Further, input motion data from character A includes bone-lengths scaled by character height.

According to various implementations, the system 400 is trained using a cycle consistency objective in addition to the weak supervision objective described above, along with a velocity objective on the end-effectors of the target object B to enable the end-effector (e.g., hands and feet) velocities to match the scaled end-effector velocities of the input motion from character A. The overall training objective function is defined by:

$$\mathcal{L}^{full} = \mathcal{L}^{weak} + \mathcal{L}^{ee} + \mathcal{L}^{cycle}$$

Generally, $\mathcal{L}^{ee}$ is the velocity objective that assists in preventing unwanted object motion, such as aberrant movement (e.g., "skating") on a surface of a visual space. In one implementation, $\mathcal{L}^{ee}$ is defined by:

$$\mathcal{L}^{ee} = \frac{1}{T}\sum_{t=2}^{T}\left\|\frac{1}{h^B}(\hat{g}_t^B - \hat{g}_{t-1}^B)_{ee} - \frac{1}{h^A}(g_t^A - g_{t-1}^A)_{ee}\right\|_2^2$$

Generally, $$\frac{1}{h^B}(\hat{g}_t^B - \hat{g}_{t-1}^B)_{ee} \text{ and } \frac{1}{h^A}(g_t^A - g_{t-1}^A)_{ee}$$

denote the global velocities of the end-effectors of the retargeted and input motion at a time step t and scaled by the respective character height. $\mathcal{L}^{cycle}$ is the cycle consistency objective, which is utilized to reconstruct the input motion. During training, the iterative optimization described above is performed in the retargeted and cycle motion outputs during training. Further, the training process observes a "curriculum learning" paradigm where the number of optimization steps is increased at each training epoch. For example, during a first epoch one optimization step is performed, during a second epoch two optimization steps are performed, and so on. This training approach enables the training process to more closely conform to the training objective.

As discussed above and depicted in FIG. 3, kinematic constraints can be enforced such as joint contacts with different surfaces of a visual space, e.g., the ground. Accordingly, the in-network iterative optimization introduced above utilizes the binary vector $c_t$ indicating which joints are in contact at time t. One example way to estimate contact information uses the following heuristic:

$$c_t = \exp\left(-\frac{1}{h^A}(\|g_t^A - g_{t-1}^A\|_2^2 + (g_t^A)^y)\right)$$

Generally, $\|g_t^A - g_{t-1}^A\|_2^2$ and $(g_t^A)^y$ are the squared velocities and the heights of all of the joints relative to the ground at time step t, respectively, and $h^A$ is the height of the character used for the input motion, e.g., character A. Further, the ground plane is defined as the lowest joint height in the input motion animation sequence. When the velocity and height of a single joint approaches 0, the exponential function will approach 1 indicating a high likelihood that joint contact with the ground has occurred. In at least one implementation, the process thresholds values above 0.9 in $c_t$ to indicate ground contact, and below 0.9 to indicate no contact. Further, at least some implementations apply a heuristic such that if both heel and toe of a contact joint are in contact with the ground, the toe is labeled as the contact point.

Having discussed example details of the techniques for motion retargeting with kinematic constraints, consider now some example procedures to illustrate additional aspects of the techniques.

Example Procedures

This section describes example procedures for motion retargeting with kinematic constraints in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as via the animation system 102 of FIG. 1 that makes use of the animator module 108 and using aspects described in the scenarios above.

Figure 5:
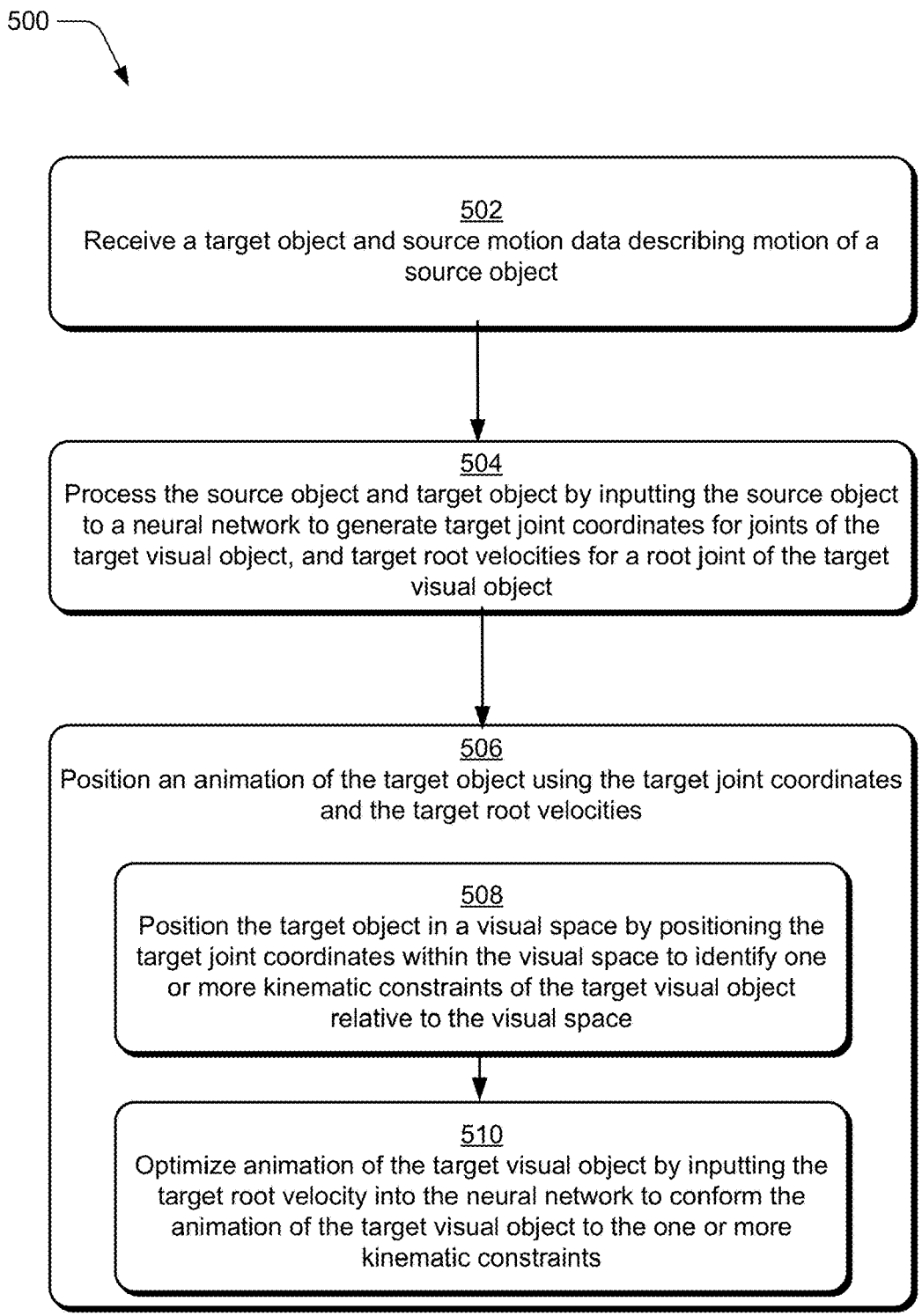
FIG. 5 depicts an example procedure for optimization of retargeting motion from a source object to a target object.

FIG. 5 depicts an example procedure 500 for optimization of retargeting motion from a source object to a target object. Step 502 receives a target object and source motion data describing motion of a source motion object. A user, for instance, selects source motion data that describes a motion sequence of a source visual object, such as a digital character, a real-world entity, and so forth. Further, the user selects a target visual object to receive retargeted motion from the source object. In at least one implementation, this is performed via interaction with the animator GUI 134.

Step 504 processes the source motion object and the target object by inputting the source motion object to a neural network to generate target joint coordinates for joints of the target visual object, and target root velocities for a root joint of the target visual object. Example ways for processing the source motion data are detailed throughout, such as with reference to the system 400 and the procedure 600.

Step 506 positions an animation of the target visual object using the target joint coordinates and the target root velocities. The target joint coordinates and the target root velocities, for instance, are applied to joints and a root joint position, respectively, to animate the target visual object. As part of positioning the animation, step 508 positions the target visual object in a visual space by positioning, based on a target root velocity, the target joint coordinates within the visual space to identify one or more kinematic constraints of the target visual object relative to the visual space. The positioning module 114, for instance, places the target joint coordinates of the target object into a visual space, such as by positioning the target joint coordinates at corresponding coordinates of a visual coordinate space. As described throughout, the visual space may include different surfaces, such as a ground surface, walls, and so forth. Accordingly, the visual relationship of the target visual object with such surfaces (e.g., contact with a ground surface) may represent kinematic constraints to be observed during motion retargeting to the target visual object.

Also as part of positioning the animation, step 510 optimizes animation of the target visual object by inputting the target root velocity into the neural network to conform the animation of the target visual object to the one or more kinematic constraints. The optimization module 116, for example, backpropagates the root velocity (e.g., $\hat{v}^{xyz}$) of the target object through the decoder RNN 404 to be used to iteratively optimize animation of the target object. Generally, iterative optimization can be performed a maximum number of times (e.g., 30 iterations) and/or until optimization begins providing results that increasingly deviate from defined kinematic constrains, e.g., a maximum conformance to a kinematic constraint is achieved.

Figure 6:
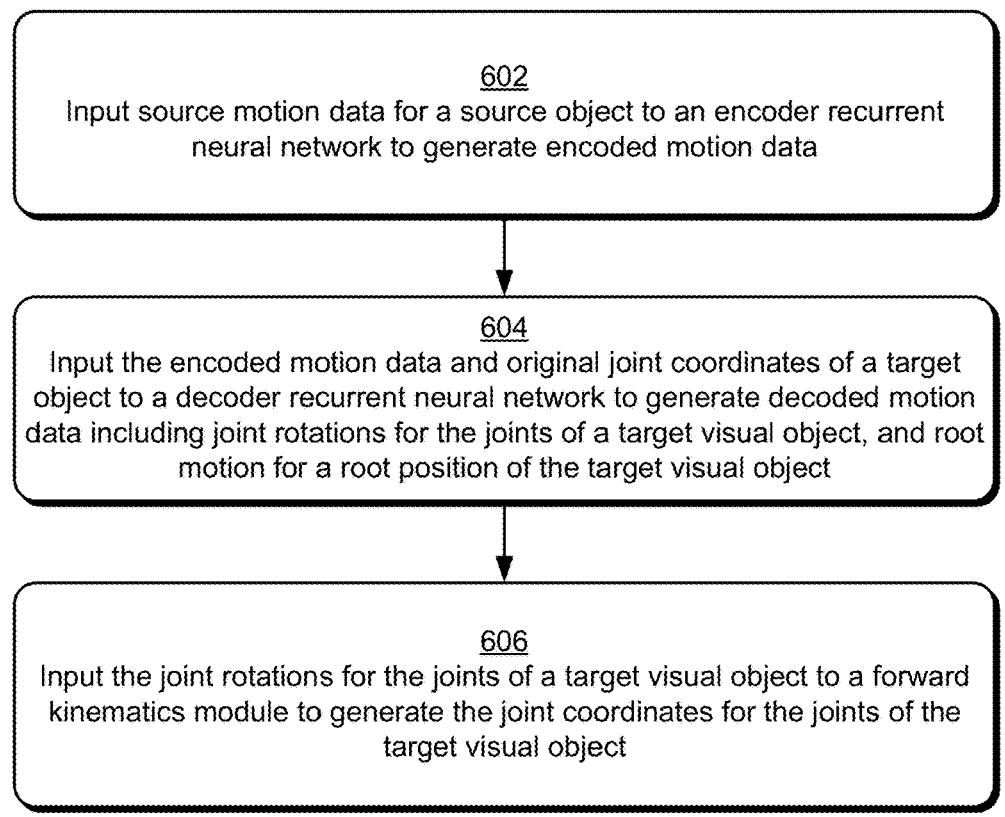
FIG. 6 depicts an example procedure for retargeting motion from a source object to a target object.

FIG. 6 depicts an example procedure 600 for retargeting animation from a source object to a target object. The procedure 600, for instance, represents an example way for performing step 504 of the procedure 500, above.

Step 602 inputs source motion data for a source motion object to an encoder recurrent neural network to generate encoded motion data. For instance, source joint coordinates and source joint velocities from source motion data are input to the encoder RNN 402, which generates an encoded version of the source joint coordinates and source joint velocities. In at least one implementation, the encoded version represents an encoded feature vector and/or sequence of feature vectors that describe joint attributes such as position and velocities and different time steps of the source motion data.

Step 604 inputs the encoded motion data and original joint coordinates of a target object to a decoder recurrent neural network to generate decoded motion data including joint rotations for the joints of a target visual object, and root motion for a root position of the target visual object. The decoder RNN 404, for instance, takes the encoded motion data (e.g., the encoded feature vector), and decodes the data by applying it to the joint coordinates of the target object to generate the joint rotations and the root velocity.

Step 606 inputs the joint rotations for the joints of a target visual object to a forward kinematics module to generate the joint coordinates for the joints of the target visual object. The FKL 406, for instance, takes the joint rotations as input, and generates pose information including joint coordinates to be used for positioning joints of the target object. As explained above, the joint coordinates can be fed back into the decoder RNN 404 for use in generating subsequent joint coordinates for subsequent poses of the target object in a retargeting animation sequence.

Figure 7:
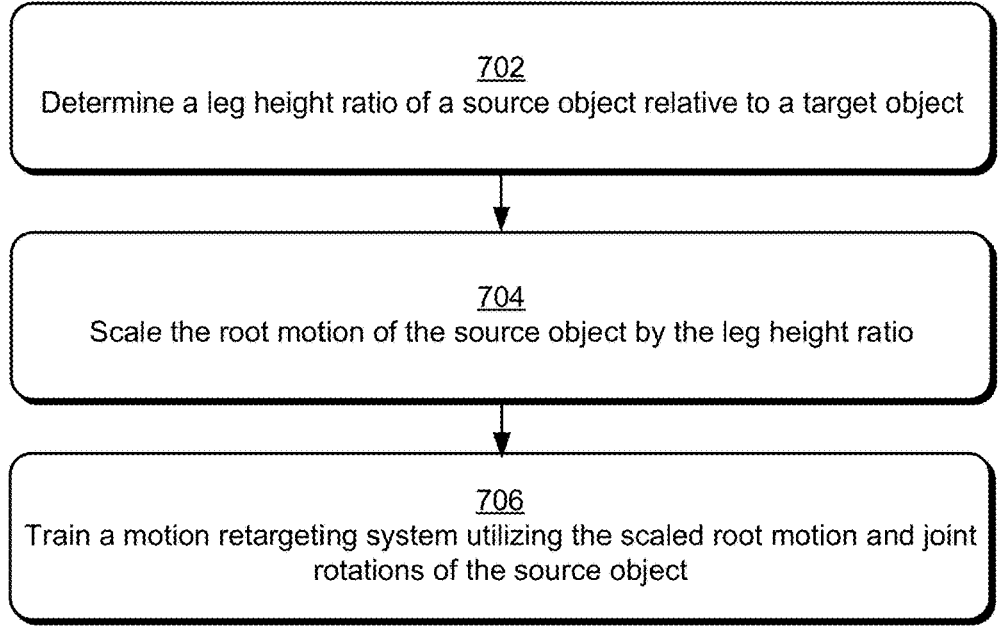
FIG. 7 depicts an example procedure for training a motion retargeting system.

FIG. 7 depicts an example procedure 700 for training a motion retargeting system. Step 702 determines a leg height ratio of a source object relative to a target object. The training module 118, for instance, determines respective measurements of the leg heights of the source object and the target object, and determines a ratio of these respective measurements. Generally, a visual object's "leg" refers to a support structure utilized to make contact with a surface of a visual space, such as a humanoid leg in a digital representation of a human.

Step 704 scales the root motion of the source object by the leg height ratio. The leg height ratio, for instance, is utilized to adjust the root motion value, such as via multiplication of the leg height ratio by the root motion value.

Step 706 trains a motion retargeting system utilizing the scaled root motion and joint rotations of the source object. The training module 118, for instance, implements the weak supervision and the training objective described above to train the system 400.

Accordingly, the described techniques can be employed to accurately retarget motion data from a source motion sequence to a target visual object.

Having described example procedures in accordance with one or more implementations, consider now an example system and device that can be utilized to implement the various techniques described herein.

Example System and Device

Figure 8:
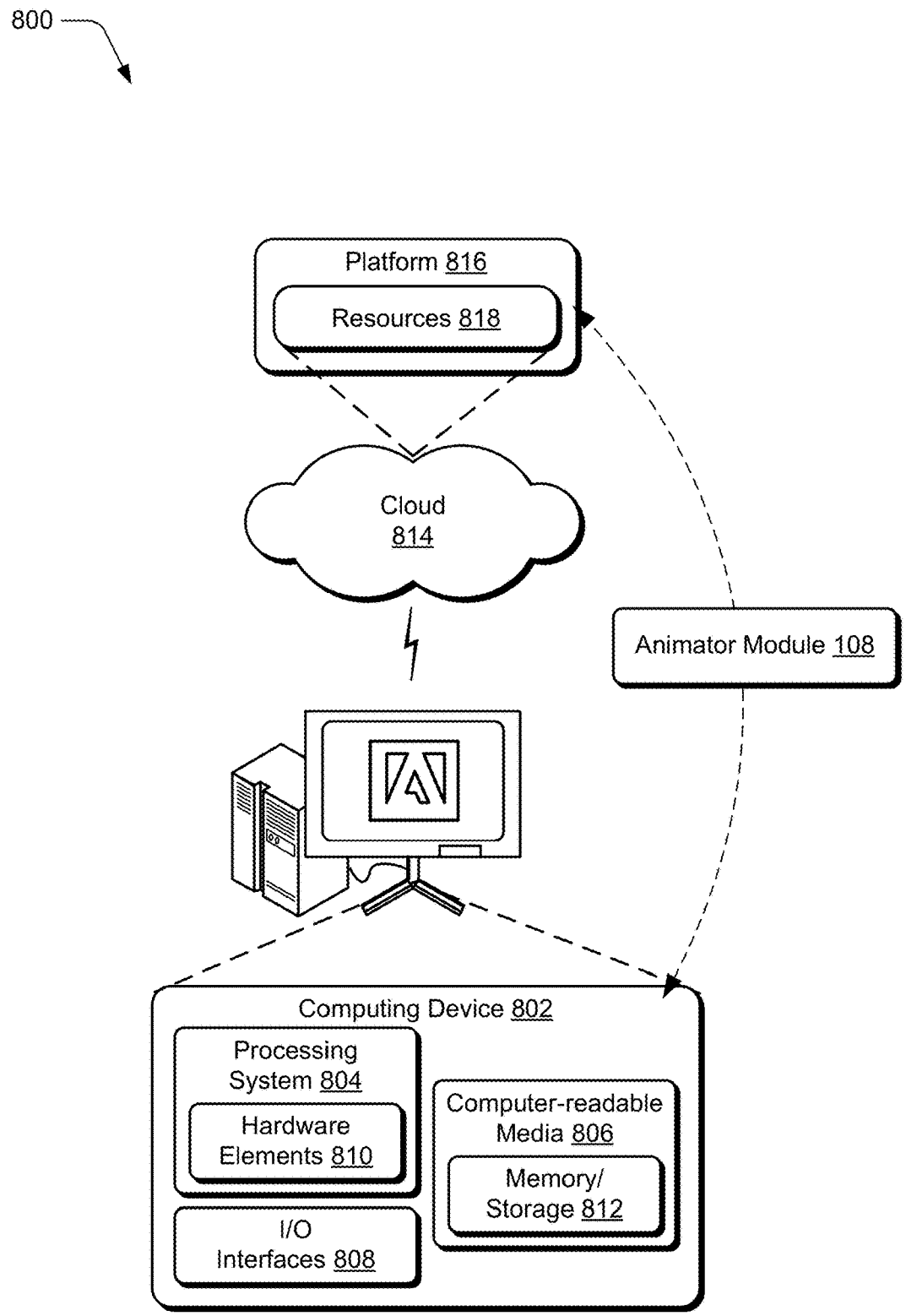
FIG. 8 illustrates an example system including various components of an example device that can be implemented as any type of computing device as described and/or utilized with reference to FIGS. 1-7 to implement aspects of the techniques described herein.

FIG. 8 illustrates an example system generally at 800 that includes an example computing device 802 that is representative of one or more computing systems and/or devices that may implement the various techniques described herein. This is illustrated through inclusion of the animator module 108. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for retargeting an animation implemented by at least one computing device, the method comprising:
    processing, by the at least one computing device, a source motion object by inputting the source motion object to a neural network to generate target joint coordinates for target joints of a target visual object, and a target root velocity for a target root joint of the target visual object;
    animating, by the at least one computing device, the target visual object by positioning the target joints based on the target joint coordinates and the target root joint based on the target root velocity; and
    implementing, by the at least one computing device, a supervision operation for the neural network for tuning animation of the target visual object, the supervision operation utilizing root motion data from the source motion object as scaled based on a ratio of a leg height of the source motion object, and a leg height of the target visual object.

2. The method as described in claim 1, wherein said processing comprises:
    inputting source motion data for the source motion object to an encoder neural network to generate encoded motion data;
    inputting the encoded motion data to a decoder neural network to generate decoded motion data including joint rotations for the target joints of a target visual object, and root motion for a root position of the target visual object; and
    inputting the joint rotations for the target joints of a target visual object to a forward kinematics module implemented at least partially in hardware of the at least one computing device to generate the target joint coordinates for the target joints of the target visual object.

3. The method as described in claim 1, wherein said positioning the target joints comprises positioning, based on the target root velocity, the target joint coordinates in a visual space to identify one or more kinematic constraints of the target visual object relative to the visual space.

4. The method as described in claim 3, wherein the one or more kinematic constraints are based on contact of one or more structural members of the target visual object with one or more surfaces of the visual space.

5. The method as described in claim 3, further comprising optimizing animation of the target visual object by inputting the target root velocity into a neural network to conform the animation of the target visual object to the one or more kinematic constraints.

6. The method as described in claim 5, wherein said optimizing animation of the target visual object comprising backpropagating the target root velocity through the neural network.

7. The method as described in claim 1, wherein said positioning the target joints comprises positioning, based on the target root velocity, the target joint coordinates in a visual space to identify one or more kinematic constraints of the target visual object relative to the visual space, the method further comprising optimizing animation of the target visual object by backpropagating the target root velocity through a decoder of the neural network to cause the target root joint to move globally within the visual space toward one or more constraint points defined by the one or more kinematic constraints.

8. A system for retargeting an animation implemented, the system comprising:
    a retargeting model implemented at least partially in hardware of at least one computing device to take source motion data from a source motion object as input and output target animation data to be applied to animate a target object, the target animation data including joint coordinates for joints of a target visual object, and a root velocity for a root joint of the target visual object;
    a positioning module implemented at least partially in the hardware of the at least one computing device to position the target visual object including to position, based on the root velocity, the joint coordinates to animate the target visual object; and
    a training module implemented at least partially in the hardware of the at least one computing device to use joint rotation data and root motion data from the source motion data to perform supervision to tune the animation of the target visual object, including to use the root motion data as scaled based on a ratio of a leg height of the source motion object animated in the source motion data, and a leg height of the target visual object.

9. The system as described in claim 8, wherein the retargeting model comprises:
    an encoder recurrent neural network implemented to take the source motion data as input to generate encoded motion data;
    a decoder recurrent neural network implemented to take the encoded motion data and joint coordinates for the target visual object as input, and generate decoded motion data including the root velocity for the root joint of the target visual object and joint rotations for the joints of the target visual object; and
    a forward kinematics module implemented to take the joint rotations as input and generate the joint coordinates for the joints of the target visual object.

10. The system as described in claim 8, wherein to position the target visual object includes to position, based on the root velocity, the joint coordinates within a visual space to identify one or more kinematic constraints of the target visual object relative to the visual space.

11. The system as described in claim 10, wherein the one or more kinematic constraints are based on contact of one or more structural members of the target visual object with one or more surfaces of the visual space.

12. The system as described in claim 10, further comprising an optimization module implemented at least partially in the hardware of the at least one computing device to optimize animation of the target visual object by inputting the root velocity into the retargeting model to conform the animation of the target visual object to the one or more kinematic constraints.

13. The system as described in claim 12, wherein to optimize animation of the target visual object includes to backpropagate the root velocity through the retargeting model.

14. A system for retargeting animation, the system comprising:
one or more processors; and
one or more computer-readable storage media storing instructions that are executable by the one or more processors to:
invoke a neural network to take a source motion object as input and output target animation data to be applied to animate a target object, the target animation data including target joint coordinates for target joints of a target visual object, and a target root velocity for a target root joint of the target visual object;
animate the target visual object including to position the target joints based on the target joint coordinates and the target root joint based on the target root velocity; and
implement a supervision operation for the neural network to tune animation of the target visual object, the supervision operation including to utilize root motion data from the source motion object as scaled based on a ratio of a leg height of the source motion object, and a leg height of the target visual object.

15. The system as described in claim 14, wherein to invoke the neural network includes to:
invoke an encoder recurrent neural network to take source motion data as input to generate encoded motion data;
invoke a decoder recurrent neural network to take the encoded motion data and joint coordinates for the target visual object as input, and generate decoded motion data including the target root velocity for the target root joint of the target visual object and joint rotations for the target joints of the target visual object; and
invoke a forward kinematics module to take the joint rotations as input and generate the joint coordinates for the target joints of a target visual object.

16. The system as described in claim 14, wherein to position the target visual object includes to position, based on the target root velocity, the target joint coordinates within a visual space to identify one or more kinematic constraints of the target visual object relative to the visual space.

17. The system as described in claim 16, wherein the one or more kinematic constraints are based on contact of one or more structural members of the target visual object with one or more surfaces of the visual space.

18. The system as described in claim 16, wherein the instructions are further executable by the one or more processors to optimize animation of the target visual object including to input the target root velocity into the neural network to conform the animation of the target visual object to the one or more kinematic constraints.

19. The system as described in claim 18, wherein to optimize animation of the target visual object includes to backpropagate the target root velocity through the neural network.

20. The system as described in claim 14, wherein to position the target joints comprises to position, based on the target root velocity, the target joint coordinates in a visual space to identify one or more kinematic constraints of the target visual object relative to the visual space, wherein the instructions are further executable by the one or more processors to optimize animation of the target visual object including to backpropagate the target root velocity through a decoder of the neural network to cause the target root joint to move globally within the visual space toward one or more constraint points defined by the one or more kinematic constraints.

* * * * *